EDWARD M. DEEMS AND LE ROY W. WILLIS.
BATTERY.
APPLICATION FILED OCT. 31, 1919.
1,373,801.
Patented Apr. 5, 1921.
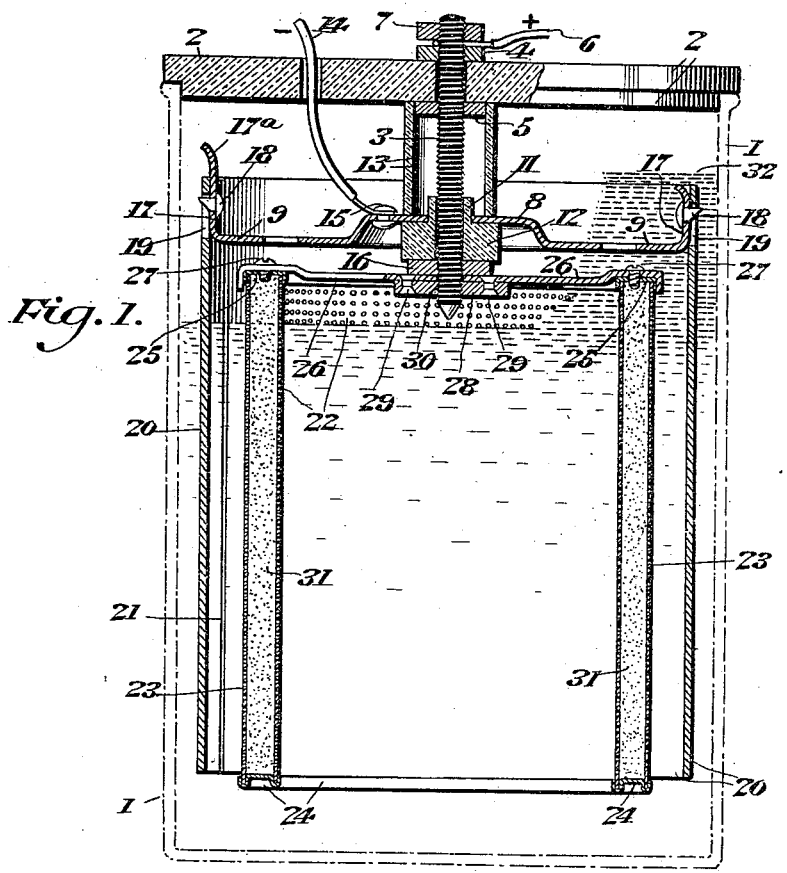
Fig. 1.
Fig. 2.
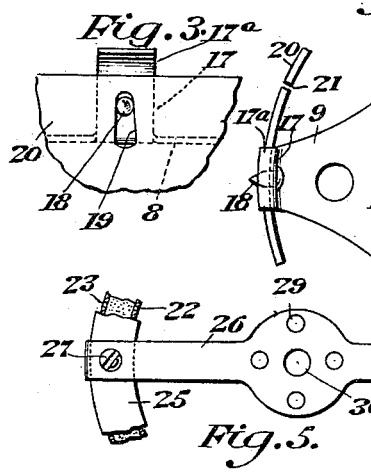
Fig. 3.
Fig. 4.
Fig. 5.
Inventors
Edward M. Deems
& Le Roy W. Willis
By
Attorney

UNITED STATES PATENT OFFICE.

EDWARD M. DEEMS, OF FOREST HILLS, NEW YORK, AND LE ROY W. WILLIS, OF HOBOKEN, NEW JERSEY, ASSIGNORS TO EASTERN SIGNAL & SUPPLY COMPANY, INC., OF NEW YORK, N. Y., A CORPORATION OF NEW YORK.

BATTERY.

1,373,801. Specification of Letters Patent. Patented Apr. 5, 1921.

Application filed October 31, 1919. Serial No. 334,781.

*To all whom it may concern:*

Be it known that we, EDWARD M. DEEMS and LE ROY W. WILLIS, citizens of the United States, and residents of Forest Hills, county of Queens, and State of New York, and of Hoboken, county of Hudson, and State of New Jersey, respectively, have invented certain new and useful Improvements in Batteries, (Case A,) of which the following is a specification.

This invention relates to improvements in electric batteries, and more particularly to primary batteries of the one-fluid type.

The invention has for its principal object the provision of a primary battery having its positive and negative elements or electrodes suspended from and detachably held to battery terminals or pole pieces secured to the cover of the battery jar.

Another object of the invention is to provide a primary battery having a jar cover and a centrally disposed positive terminal member or binding post extending through the cover and secured thereto, a negative terminal or pole-piece supported on the positive terminal member or pole-piece, and concentric tubular positive and negative elements detachably held to and suspended from said terminal members.

A further object of the invention is to provide a primary battery having a jar cover and positive and negative terminal members or pole pieces extending within the jar and removable with the cover, and concentric tubular negative and positive elements detachably held at their upper ends to said positive and negative terminal members and suspended therefrom within the battery jar.

Another object of the invention is to provide a battery having an inner tubular negative element and an outer tubular positive element concentric with the inner element, and means for suspending said elements in spaced relation from the battery jar cover.

In the accompanying drawings, Figure 1 is a vertical sectional view of a primary battery constructed in accordance with the present invention;

Fig. 2 detail plan view of the negative pole-piece or terminal member, showing the means for detachably securing the positive or zinc electrode thereto;

Figs. 3 and 4 detail views in side elevation illustrating the two forms of connections between the negative pole terminal member and the positive element or tubular zinc electrode of the battery; and Fig. 5 a detail plan view of the negative element.

Referring to the various parts by numerals, 1 designates the battery jar, which may be formed of glass, porcelain, or other suitable material, and 2 designates the removable cover of the jar, which may be formed of any suitable insulating material. A threaded metallic post or positive pole terminal member 3 extends through a central aperture in the jar cover 2 and is held to said cover by clamping nuts 4 and 5 threaded on the post and engaging opposite faces of the cover. The upper end of the terminal member 3 serves as a binding post to which one line wire 6 may be connected by means of a binding nut 7.

The negative pole terminal member or battery element support 8 is preferably formed of a sheet metal plate having four radially extending arms 9 and a central aperture 10 adapted to receive an upstanding tubular boss 11 formed on a block 12 of porcelain or other insulating material loosely mounted on the threaded post 3. The terminal member 8 is clamped by means of a nut 16 between the block 12 and a sleeve 13 of porcelain or other insulating material surrounding post 3 and bearing at its upper end against the under side of the jar cover 2. The end of the other line wire 14 of the circuit is connected with a rivet 15 or other suitable connecting device or binding post carried by the negative pole terminal member 8.

The outer ends of arms 9 of the sheet metal spiderlike member 8 are bent upwardly at right angles to the plane of the arms to form slightly resilient upstanding battery element supporting and spacing devices 17 provided with rigid outwardly projecting studs 18. The side and lower edges of the studs 18 are preferably beveled as shown to facilitate engagement of the studs in tapered or wedge shaped slots 19 in the tubular zinc or positive battery element 20 when the member 8 is forced into the upper end of the zinc element. The tubular zinc electrode is preferably split vertically at 21 as is usual in the art. This split formation of the zinc electrode facilitates attachment and disconnection of the electrode from its supporting pole-piece or terminal member 8 as it permits yielding of the electrode as well as of the upstanding projections 17.

Certain of the upstanding end portions 17 of the arms 9 are extended upwardly to a point above the upper edge of the zinc electrode to form finger pieces 17a adapted to be forced inwardly to disengage lugs or studs 18 from the slots 19 in the electrode. I prefer to form at least two adjacent upstanding end portions 17 with the extensions or finger pieces 17a, as shown in Fig. 2. It will be obvious that by pressing the two adjacent finger pieces inwardly the member 8 and the zinc electrode may be readily separated by a relative rocking movement thereof. The elongated tapered slots 19 permit ready detachment of the zinc electrode when desired, and also permit the electrode to lower relatively to the member 8 by reason of its weight until the edges of the slots bind firmly against the studs 18, thus affording a firm and steady connection between the electrode and its supporting plate 8. The plate 8 may be perforated, as shown, to reduce the weight thereof.

The negative element of the battery comprises a double-walled tubular metallic casing or cage having perforated or reticulated inner and outer walls 22 and 23 preferably formed of sheet metal, the space between the two concentric walls being closed at the upper and lower ends of the element by imperforate sheet metal rings or annular closure members 24 and 25 welded or otherwise secured to the walls 22 and 23. A sheet metal supporting and positioning bar 26 extends across the top of the cage and is secured to the upper closure ring 25 thereof by screws 27 or other suitable fastening devices. The bar 26 is enlarged midway its ends and a relatively thick metallic reinforcing disk 28 is permanently held thereto by suitable rivets 29. The disk 28 affords a sufficient thickness of metal at the center of the bar 26 to permit the formation of a threaded aperture 30 to adapt the negative element to be detachably held to the lower end of the threaded post 3. The thin annular space between the walls 22 and 23 of the negative element is filled with a suitable depolarizing agent 31, such as flaked or comminuted copper oxid.

It will be observed that both the zinc electrode and the negative element are detachably held at their upper ends to their respective pole pieces or terminal members and depend therefrom into the exciting fluid or electrolyte 32 with their lower ends terminating above the bottom of the jar 1. As the two elements or electrodes are of tubular form and do not rest upon the bottom of the jar the fluid electrolyte is free to circulate around both sides of both electrodes. It will be observed also that, as both pole pieces or terminal members 3 and 8 are secured to the jar cover 2, the elements may be lifted with the cover from the jar to permit cleaning thereof or the substitution of new elements without disconnecting the pole pieces from the cover or disturbing the connections of the line wires with the poles of the battery. As the jar cover and set of pole-pieces or terminal members are not subject to rapid deterioration, they may be employed for long periods of time, the battery being renewed from time to time by simply substituting a new zinc electrode or a new negative element as conditions require. It will be obvious that by constructing a battery as above described, a material saving in cost and labor of maintenance is afforded.

What we claim is:

1. A primary battery comprising a jar, a removable jar cover, a terminal member held to the jar cover and depending within the jar, a second terminal member, means for supporting the second terminal member within the jar on the other terminal member, and independently removable negative and positive elements suspended within the jar from said terminal members and detachable therefrom without disturbing the connection between the terminal members and jar cover.

2. A primary battery comprising a jar, a removable jar cover, a metallic post-like terminal member extending through the cover substantially centrally thereof and held thereto, a metallic plate-like terminal member having a central aperture through which the other terminal member extends, means for supporting the plate-like terminal member on the post-like terminal member, a cylindrical negative element detachably held at its upper end to the lower end of the post-like terminal member, and a tubular positive element surrounding the negative element and detachably held at its upper end to the plate-like terminal member.

3. A primary battery comprising a jar, a removable jar cover, a metallic post forming one terminal of the battery held to the cover and extending therethrough centrally of the cover, a negative element detachably suspended from the lower end of said post, a sheet metal plate forming the other battery terminal supported on and insulated from the post and provided with radially extending arms having upstanding yieldable end portions provided with outwardly extending projections, and a tubular positive element surrounding the negative element and provided adjacent its upper end with apertures in which the projections on the end portions of said arms engage.

4. A primary battery comprising a jar, a removable jar cover, a metallic post forming one terminal of the battery held to the cover and extending therethrough centrally of the cover, a negative element detachably suspended from the lower end of said post, a sheet metal plate forming the other battery terminal supported on and insulated from the post and provided with radially extending arms having upstanding yieldable end portions provided with outwardly extending projections, and a tubular positive element surrounding the negative element and provided adjacent its upper end with downwardly flaring slots receiving the projections on the end portions of said arms, certain of the end portions of said arms being extended upwardly above the upper end of the positive element to form finger pieces.

5. The combination with a primary battery cover, of a metallic post-like battery terminal held thereto and extending through the cover centrally thereof, a sheet metal plate-like battery terminal located at the under side of the cover and having a central aperture through which the other terminal extends, means for insulating the battery terminals from each other, and means for supporting the plate-like terminal on the post-like terminal.

6. A primary battery comprising an exciting fluid container, a removable cover for the container, a pair of terminal members suspended within the upper portion of the container from said cover and removable from the container with the cover, a positive element, a reticulated metallic cage containing a depolarizing agent, and means forming separable connections between said terminal members and the positive element and cage for suspending said element and cage within the container.

In testimony whereof we hereunto affix our signatures.

EDWARD M. DEEMS.
LE ROY W. WILLIS.